United States Patent

Tice

[11] 3,934,706
[45] Jan. 27, 1976

[54] ARTICLE COMBINING LIVE WALL GUIDE RAIL

[76] Inventor: Joseph Tice, 502 Poinsettia Drive, Simpsonville, S.C. 29681

[22] Filed: June 24, 1974

[21] Appl. No.: 482,757

[52] U.S. Cl.................. 198/32; 198/127; 193/35 R
[51] Int. Cl.².......................................... B65G 47/26
[58] Field of Search ....... 198/30, 29, 31 R, 32, 127, 198/137, 202; 193/35 R, 35 MD, 35 C

[56] References Cited
UNITED STATES PATENTS

| | | | |
|---|---|---|---|
| 498,649 | 5/1893 | Hallock............................ | 193/35 R |
| 571,828 | 11/1896 | Conklin et al. .................. | 193/35 R |
| 902,053 | 10/1908 | Clark ................................ | 193/35 R |
| 2,925,926 | 2/1960 | Packman et al. ................. | 198/32 X |
| 3,628,647 | 12/1971 | Beard............................... | 198/32 X |
| 3,679,043 | 7/1972 | Becker............................. | 193/35 MD |
| 3,701,412 | 10/1972 | Wriedt.............................. | 198/127 R |
| 3,763,992 | 10/1973 | Klenk............................... | 198/127 R |

*Primary Examiner*—Robert J. Spar
*Assistant Examiner*—James M. Slattery
*Attorney, Agent, or Firm*—Bailey & Dority

[57] ABSTRACT

An apparatus for channeling a disorderly array of articles that are being transported on a conveyor into a uniform single row of articles. The apparatus includes a pair of spaced article confining walls. The walls converge towards each other in a direction corresponding to the flow of the articles. One of the walls has a plurality of longitudinally spaced vertically extending rows of beads provided thereon for engaging the disorderly array of articles as they pass therethrough and force such into single file minimizing jamming thereof.

3 Claims, 6 Drawing Figures

U.S. Patent   Jan. 27, 1976   Sheet 1 of 2   3,934,706
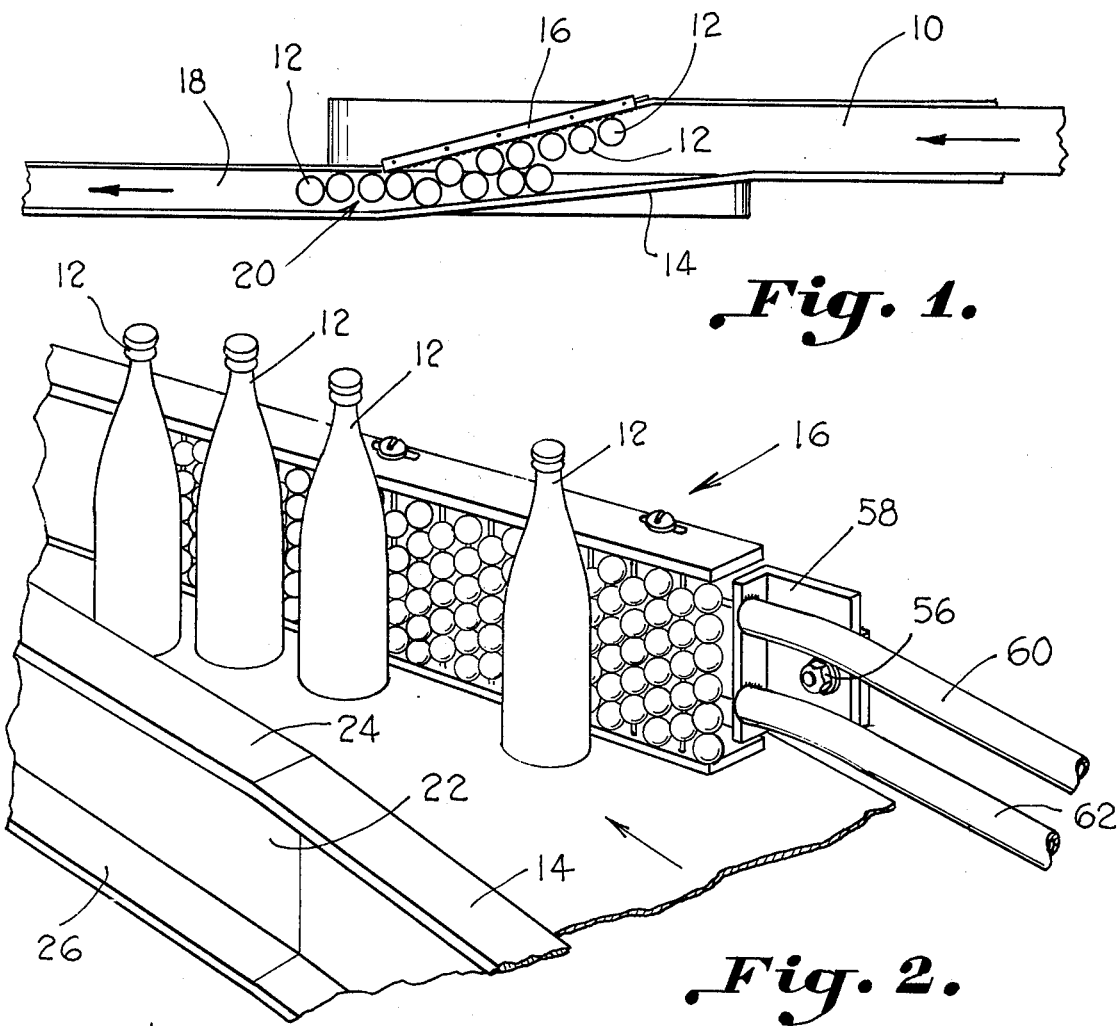
Fig. 1.
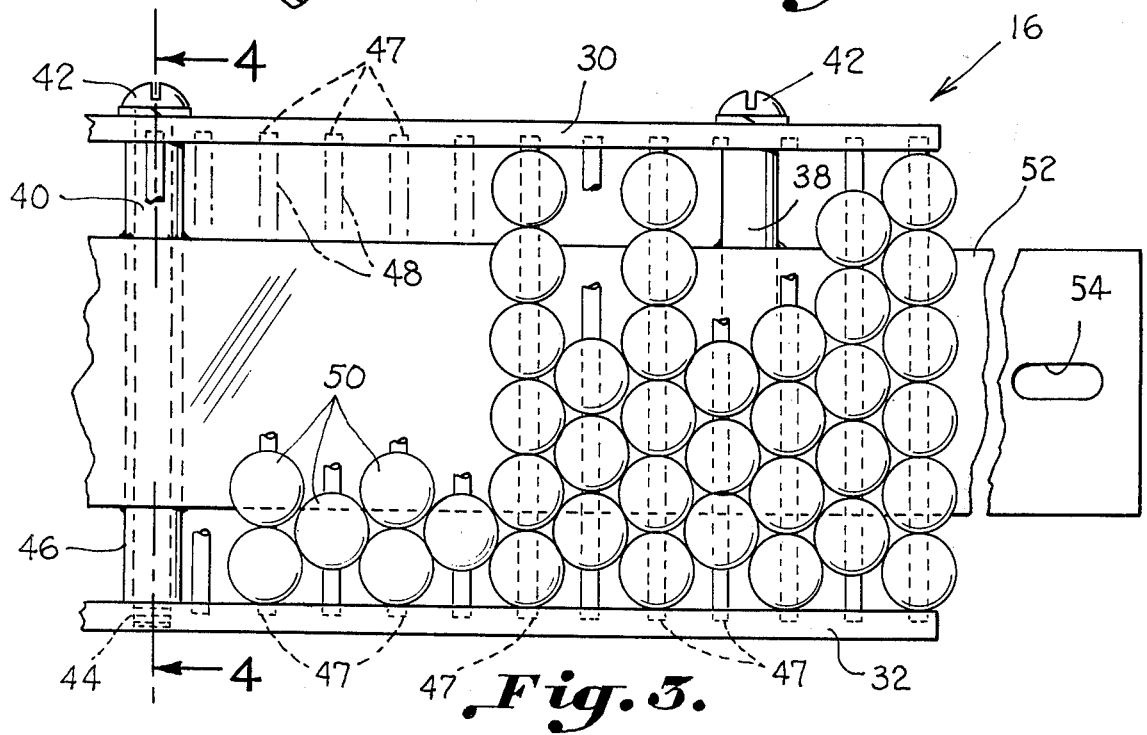
Fig. 2.
Fig. 3.

ARTICLE COMBINING LIVE WALL GUIDE RAIL

BACKGROUND OF THE INVENTION

This invention relates to an article conveying device and more particularly to an article conveying device wherein a disorderly array of articles are re-arranged into a single, uniform row of articles.

Heretofore, when articles were being transferred along a conveyor in a disorderly array and it was necessary to place the articles into single file so that some function could be performed thereto such as filling with fluid, the bottles or articles were often passed between converging walls. One problem with passing the articles between converging walls as they were carried on a moving conveyor is that they would sometimes jam between the walls. The jamming of the bottles would interrupt the normal supply of bottles to the apparatus.

Various devices have been developed for causing articles to be transformed from a disorderly array into a single file and two of such apparatus are disclosed in U.S. Pat. Nos. 3,310,151 and 3,604,551. In U.S. Pat. No. 3,310,151, the articles are fed between converging walls into a single row. This device appears to depend upon critical alignment of the walls for proper operation.

In U.S. Pat. No. 3,604,551, accumulating belts are utilized in combination with various conveyors for transforming the articles from a disorderly array into single file. As shown therein, substantial amounts of equipment must be utilized in order to obtain this single file of articles.

SUMMARY OF THE INVENTION

In accordance with the present invention, it has been found that articles such as bottles and cans can be channeled from a disorderly array into a uniform row of single file articles. These articles can be transported on a single conveyor or can be shifted from one conveyor to another. The apparatus for transforming such articles includes a pair of spaced article confining walls. The spaced walls converge towards each other in a direction corresponding to the flow of the articles on the conveyor. The spaced walls have a wide end for receiving the disorderly array of articles and a narrow end for directing the articles into a uniform row of single file articles. A plurality of longitudinally spaced, vertically extending rows of beads define the surface of one of said walls. These beads are rotatably supported so that as the articles of the disorderly array engage the beads while being moved forward on the conveyor, the beads tend to rotate permitting the articles to be moved through the narrow end of the spaced wall without jamming. The wall with the beads thereon can be referred to as a live wall and takes the overall configuration of an abacus.

Accordingly, it is an important object of the present invention to provide an apparatus for channeling a disorderly array of articles being transported on a conveyor into a uniform, single file row of articles.

Another important object of the present invention is to provide a simple wall having rotating elements therein for engaging bottles being passed thereby and directly such in a particular direction.

Still another important object of the invention is to provide a wall of beads for engaging articles being transported on a conveyor and for directing the articles in a particular direction.

These and other objects and advantages of the invention will become apparent upon reference to the following specification, attendant claims and drawings.

BRIEF DESCRIPTION OF THE DRAWINGS

FIG. 1 is a schematic, plan view showing articles being moved along a conveyor in a disorderly array engaging a wall which directs such into a single file, FIG. 2 is an enlarged, perspective view illustrating a live wall constructed in accordance with the present invention, FIG. 3 is an enlarged, elevational view with parts removed for purposes of clarity illustrating a live beaded wall constructed in accordance with the present invention.

DESCRIPTION OF A PREFERRED EMBODIMENT

Figure 4:
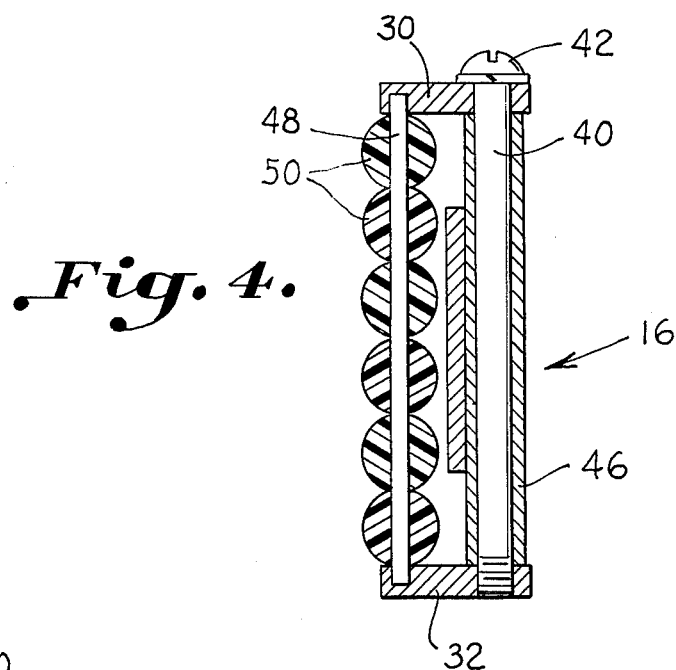
FIG. 4 is a sectional view taken along line 4—4 of FIG. 3.

Referring in more detail to the drawings, there is illustrated in FIG. 1 a conveyor belt 10 moved to the left as indicated by the arrow. Carried on this conveyor belt 10 is a disorderly array of articles 12. Positioned adjacent the left hand end of the conveyor belt are a pair of spaced article-confining walls 14 and 16. The spaced article-confining walls converge towards each other in a direction corresponding to the flow of the articles on the conveyor 10. The spaced walls 14 and 16 have a wide end which extends over the conveyor 10 for receiving the disorderly array of bottles 12. The spaced converging walls 14 and 16 also have a narrow end that is positioned over another conveyor 18 to which a single file row of articles, generally designated by the reference character 20, is deposited. The articles 12 may be any type of articles which are usually round, and in the drawings, such are illustrated as bottles. The wall 14 may be any suitable conventional wall constructed of rods or a smooth, flat member such as shown in FIG. 2. In FIG. 2, the wall is defined by an elongated, vertical member 22 that is joined by horizontal members 24 and 26 carried on the top and bottom thereof. The inner wall of the vertical member 22 engages the bottles as such pass thereby.

The live wall 16 is constructed of a pair of vertically spaced, horizontal, flat bars 30 and 32. These flat bars may be constructed of any suitable material such as aluminum or stainless steel. The upper flat bar 30 has a pair of elongated slots 34 and 36 provided therein. Extending through the slots 34 and 36 are frame spacers 38 and 40, respectively. Each of the frame spacers 38 and 40 has an enlarged head 42 which rest against an upper surface of the flat bar member 30. Threads 44 are provided on a lower end for threadably engaging the lower flat bar 32. The frame spacers have a larger diameter sleeve 46 carried thereon which extends between the lower and upper flat bar members 32 and 30, respectively, so that when the frame spacers 38 and 40 are rotated the threads 44 carried in the bottom thereof draw the lower flat bar member 32 toward the upper flat bar member 30 until there is a rigid connection between the upper and lower members 30 and 32. Also provided in the upper and lower flat bar members 30 and 32 are recesses 47 into which the vertically extending rods 48 are provided.

Figure 5:
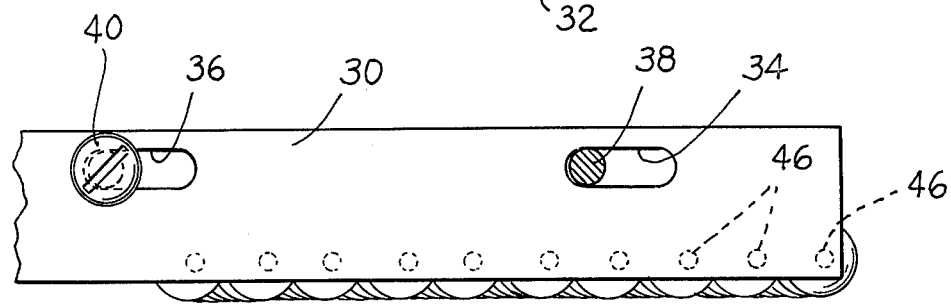
FIG. 5 is a plan view showing a portion of the live wall.

A plurality of beads 50, each of which have a bore extending therethrough, are threaded on the rods 48 so as to provide a plurality of longitudinally spaced vertically extending rows of beads. The beads, in one particular application, are constructed of phenolic and have a diameter of one-half inch. The rods 48 are carried between the spaced, flat members 30 and 32 in such a manner that the beads extend inwardly beyond the inner surface of the flat members 30 and 32 such as illustrated in FIG. 5.

The bore extending through the beads 50 is slightly larger than the diameter of the rod 48 so that the beads 50 can be rotated readily when a bottle is forced thereagainst. An elongated flat bar 52 is welded to the frame spacers 38 and 40 so as to provide a means of mounting the live wall 20. Positioned in the end of the elongated, flat bar 52 are elongated mounting slots 54. Bolts 56 extend through the elongated slots 54 and are attached to any suitable means such as a bracket 58 of an adjoining rail defined by the elongated rods 60 and 62. Any suitable means could be utilized for mounting or supporting the rail 16.

In operation, as the disorderly array of bottles is shifted along on the conveyor 10, the bottles 12 engage the surface of the live wall 16. The surface that the bottles engage is defined by the rotatable beads 50. If several of the bottles engage the beads simultaneously, such as shown in FIG. 1, and other bottles extend laterally towards the fixed wall 14, the beads will rotate preventing the bottles 12 from becoming jammed between the converging walls 14 and 16.

The bottles 12 are manipulated between the walls until they can be forced into the single file row such as illustrated in FIG. 1.

Figure 6:
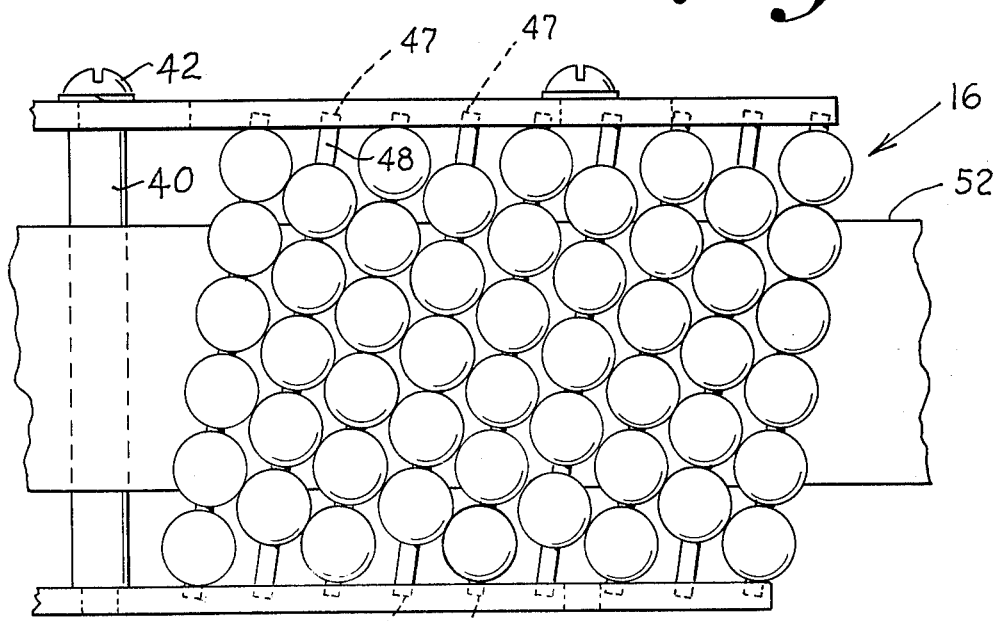
FIG. 6 is an enlarged, side elevational view illustrating the live wall with the rows of beads shifted at an angle producing a smoother contact surface.

Sometimes as the bottles are passing through the converging walls 14 and 16 chattering takes place. In order to minimize the chattering, the vertical alignment of the rows of beads 50 can be altered such as illustrated in FIG. 6 to produce a smoother surface to the oncoming bottles. Such is accomplished by loosening the frame spacers 38 and 40 and sliding the upper bar longitudinally to the right until the spacers 38 and 40 engage the other end of the slots 34 and 36. The spacers 38 and 40 are then tightened so that the rods 48 extend upwardly at an angle as shown in FIG. 6. It is noted in FIG. 6 that the beads within the same row or column are not directly above each other. As can be seen in the drawings the beads 50 of adjacent rows are touching each other and are nested within each other. Furthermore, the beads 50 of each row are stacked one on top of the other.

Since the beads 50 are spherical they make a point contact with the articles being moved on the conveyor 10 while the bore extending through the bead provides a much larger bearing surface on the rods 48.

While a preferred embodiment of the invention has been described using specific terms, such description is for illustrative purposes only, and it is to be understood that changes and variations may be mde without departing from the spirit or scope of the following claims.

What is claimed is:

1. An apparatus for channeling a disorderly array of articles being transported on a conveyor into a uniform row of articles, said articles being moved on a conveyor, the improvement comprising:

a pair of spaced articles confining walls;
said spaced walls converging towards each other in a direction corresponding to the flow of said articles on said conveyor;
said spaced walls having a wide end for receiving said disorderly array of articles and a narrow end for exiting a uniform row of said articles; one of said walls including a pair of vertically spaced elongated members, longitudinally spaced vertically extending rods carried between said elongated members, a plurality of spherical beads carried on said rods defining longitudinally spaced rows of beads, said beads each having a bore extending therethrough through which said rods extend, said beads of each row being stacked one above the other in surface contact with the bead directly above and directly below, said beads of adjacent rows being nested within each other and in surface contact with beads of adjacent rows;
whereby said beads present an aligned surface for engaging said articles with a point contact while rotating on a larger bearing surface on said rods.

2. The apparatus as set forth in claim 1 further comprising:

means for supporting said rods at an angle so that beads carried on the said rods are not in vertical alignment.

3. A wall for use with another spaced converging wall for channeling a disorderly array of articles being transported on a conveyor to a single file of articles;

said wall comprising;
a pair of vertically spaced elongated members, longitudinally spaced vertically extending rods carried between said elongated members,
a plurality of spherical beads carried on said rods defining longitudinally spaced rows of beads,
said beads each having a bore extending therethrough through which said rods extend,
said beads of each row being stacked one above the other in surface contact with the bead directly above and directly below,
said beads of adjacent rows being nested within each other and in surface contact with beads of adjacent rows,
whereby said beads present an aligned surface for engaged said articles with a point contact while rotating on a larger bearing surface on said rods.

* * * * *